US008526987B2

(12) United States Patent
Gupta et al.

(10) Patent No.: US 8,526,987 B2
(45) Date of Patent: Sep. 3, 2013

(54) RESOLVING CONTENTION FOR COMMUNICATION RESOURCES

(75) Inventors: Rajarshi Gupta, Santa Clara, CA (US); Anastasios Stamoulis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 629 days.

(21) Appl. No.: 12/356,184

(22) Filed: Jan. 20, 2009

(65) Prior Publication Data

US 2009/0227277 A1   Sep. 10, 2009

Related U.S. Application Data

(60) Provisional application No. 61/034,310, filed on Mar. 6, 2008.

(51) Int. Cl.
*H04B 7/00* (2006.01)

(52) U.S. Cl.
USPC ........ 455/512; 455/435.3; 455/450; 455/509; 455/464; 455/166.2

(58) Field of Classification Search
None
See application file for complete search history.

(56) References Cited

U.S. PATENT DOCUMENTS

| 4,630,264 | A * | 12/1986 | Wah et al. ............... 370/447 |
| 6,169,744 | B1 * | 1/2001 | Grabelsky et al. ......... 370/447 |
| 6,563,829 | B1 | 5/2003 | Lyles et al. |
| 7,474,671 | B2 * | 1/2009 | Liang et al. ............... 370/462 |
| 7,876,837 | B2 * | 1/2011 | Khawand et al. .......... 375/260 |
| 2002/0123828 | A1 * | 9/2002 | Bellmann et al. ............ 701/1 |
| 2002/0183066 | A1 * | 12/2002 | Pankaj ..................... 455/453 |
| 2004/0203658 | A1 * | 10/2004 | Narayanan ............... 455/414.1 |
| 2007/0071024 | A1 * | 3/2007 | Schentrup et al. ......... 370/443 |
| 2007/0105574 | A1 | 5/2007 | Gupta et al. |
| 2008/0165797 | A1 * | 7/2008 | Aceves ..................... 370/458 |

FOREIGN PATENT DOCUMENTS

| EP | 1179961 A1 | 2/2002 |
| JP | 2005045561 A | 2/2005 |
| WO | WO2007051140 | 5/2007 |
| WO | WO2007056630 | 5/2007 |
| WO | WO2008021784 | 2/2008 |

OTHER PUBLICATIONS

International Search Report/Written Opinion—PCT/US09/036412—International Search Authority EPO—Jul. 29, 2009.

* cited by examiner

*Primary Examiner* — Yuwen Pan
*Assistant Examiner* — Fanghwa Wang
(74) *Attorney, Agent, or Firm* — Nicholas J. Pauley; Sam Talpalatsky; Joseph Agusta (57) ABSTRACT

Contention for a resource in a multi-resource system is resolved by separately resolving contention for each resource. In some cases where two or more entities contending for a resource are associated with equal priorities, lexicographic ordering is used to resolve contention between these entities. In some cases where two or more entities contending for a resource are associated with equal priorities, a random probability-based scheme is used to resolve contention between these entities. Also, different types of schemes may be used to resolve contention for different resources.

57 Claims, 7 Drawing Sheets

RESOLVING CONTENTION FOR COMMUNICATION RESOURCES

CLAIM OF PRIORITY

This application claims the benefit of and priority to commonly owned U.S. Provisional Patent Application No. 61/034,310, filed Mar. 6, 2008, the disclosure of which is hereby incorporated by reference herein.

BACKGROUND

1. Field

This application relates generally to wireless communication and more specifically, but not exclusively, to resolving contention for communication resources.

2. Introduction

Deployment of a wireless communication system typically involves implementing some form of interference mitigation scheme. In some wireless communication systems, interference may be caused by neighboring wireless nodes. As an example, in a cellular system wireless transmissions of a cell phone or a base station of a first cell may interfere with communication between a cell phone and a base station of a neighboring cell. Similarly, in a Wi-Fi network, wireless transmissions of an access terminal or an access point of a first service set may interfere with communication between an access terminal and a base station of a neighboring service set.

U.S. Patent Application Publication No. 2007/0105574 describes a system where fair-sharing of a wireless channel may be facilitated by joint scheduling of a transmission by transmitting and receiving nodes through the use of a resource utilization message ("RUM"). Here, a transmitting node may request a set of resources based on knowledge of resource availability in its neighborhood and a receiving node may grant the request based on knowledge of resource availability in its neighborhood. For example, the transmitting node may determine channel availability by listening to receiving nodes in its vicinity and the receiving node may determine potential interference by listening to transmitting nodes in its vicinity.

In the event the receiving node is subjected to interference from neighboring transmitting nodes, the receiving node may transmit a RUM in an attempt to cause the neighboring transmitting nodes to limit their interfering transmissions. According to related aspects, a RUM may be prioritized (e.g., weighted) to indicate not only that a receiving node is disadvantaged (e.g., due to the interference it sees while receiving) and desires a collision avoidance mode of transmission, but also the degree to which the receiving node is disadvantaged. A transmitting node that receives a RUM may utilize the fact that it has received a RUM, as well as the priority thereof, to determine an appropriate response. For example, the transmitting node may elect to abstain from transmitting, may reduce its transmit power during one or more designated timeslots, may transmit on another channel, may ignore the RUM, or may take some other action. The advertisement of the RUMs and associated priorities may thus provide a collision avoidance scheme that is fair to all nodes in the system.

SUMMARY

A summary of sample aspects of the disclosure follows. It should be understood that any reference to the term aspects herein may refer to one or more aspects of the disclosure.

The disclosure relates in some aspects to resolving contention for a resource (e.g., a channel, a subchannel, an interlace, or a timeslot) in a multi-resource system. In some aspects contention in a multi-resource system may be resolved by separately resolving contention for each resource. In particular, techniques are described for resolving contention in a case where two or more entities contending for a resource are associated with equal priorities.

The disclosure relates in some aspects to using lexicographic ordering to resolve contention. For example, nodes in a system may be ranked according to a lexicographical ordering (e.g., based on node identifiers). A node associated with the highest ranking may then be given higher priority to a resource in the event there is contention for the resource.

The disclosure relates in some aspects to using a random probability-based scheme to resolve contention (e.g., where the probability is an output of a function). For example, a transmitting node may determine whether to use a resource based on a probability weighted by the number of requests for the resource that the transmitting node receives from other nodes. Here, the probability may be weighted by the proportion of the highest requests that node heard from its associated receiving nodes.

The disclosure relates in some aspects to using different contention schemes for different resources. For example, the types of contention schemes deployed for different resources may depend on the types of traffic carried by those resources or some other characteristics associated with those resources.

BRIEF DESCRIPTION OF THE DRAWINGS

These and other sample aspects of the disclosure will be described in the detailed description and the appended claims that follow, and in the accompanying drawings, wherein:

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

As an example of the above, in some aspects a method of wireless communication comprises receiving a plurality of resource utilization messages, each comprising an indication that identifies a plurality of resources; identifying, for each of the resources, priorities associated with the resource utilization messages; and resolving, for each of the resources, contention between the identified priorities. In addition, in some aspects the priorities associated with the resource utilization messages are indicated by weights included in the resource utilization messages.

For illustration purposes, various aspects of resolving contention for multiple resources will be described in the context of a wireless system where nodes in the system (e.g., access terminals) send RUMs to other nodes in the system (e.g., access points) in an attempt to reserve one or more resources. It should be appreciated that the teachings herein also may be applicable to other types of nodes, devices, and communication systems or to similar entities that are referenced using other terminology. For example, an access terminal may be referred to as user equipment, a mobile unit, and so on.

In some aspects lexicographic ordering may be used to resolve contention for multiple resources. For example, under a lexicographic resolution scheme, each RUM may be associated with a lexicographic ordering (e.g., based on an identifier of the node that sent that RUM). In this case, when a number of equal priority RUMs are received for a given one of the resources, the highest priority may be given to the RUM associated with the highest lexicographical ordering (e.g., the RUM from the node that is first in the specified order). Such a scheme may thus be used to identify a winner of each contention for each of the resources.

In some aspects a random probability-based scheme may be used to resolve contention for multiple resources. For example, under such a scheme, a transmitting node may decide whether to obey a RUM based on a probability that is the result of a function. For example, in some cases such a probability may be weighted by the number of highest priority RUMs received for a given resource. Here, the probability may be weighted by the proportion of the highest priority RUMs that a transmitting node has heard from its own receiving nodes. For example, the transmitting node may receive n equal-weight RUMs for a given one of the resources. In this case, m of the RUMs are from the transmitting node's own receiving nodes and n−m RUMs are from neighboring non-associated receiving nodes. The transmitting node may then decide to obey the RUM with probability (n−m)/n. In other words, the transmitting node may decide to transmit over the resource with probability m/n.

Figure 1:
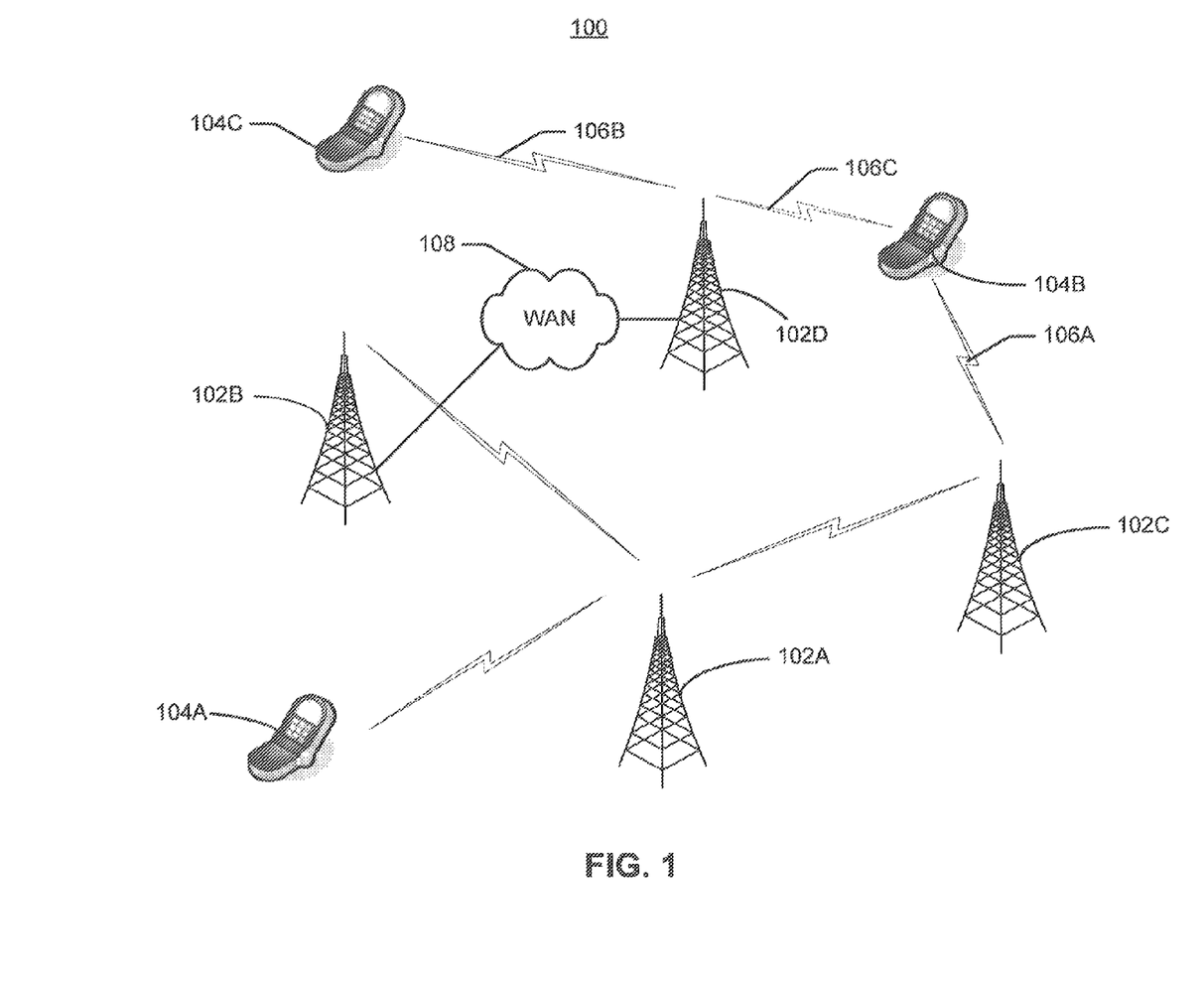
FIG. 1 is a simplified block diagram of a sample communication system.

FIG. 1 illustrates several sample aspects of a wireless communication system 100. The system 100 includes several wireless nodes, generally designated as nodes 102 and 104. A given node may receive and/or transmit one or more traffic flows (e.g., data and/or control channels). For example, each node may comprise at least one antenna and associated receiver and transmitter components. In the discussion that follows the term receiving node may be used to refer to a node that is receiving and the term transmitting node may be used to refer to a node that is transmitting. Such a reference does not imply that the node is incapable of performing both transmit and receive operations.

A node may be implemented in various ways. For example, in some implementations a node may comprise an access terminal, a relay point, or an access point. Referring to FIG. 1, the nodes 102 may comprise access points or relay points and the nodes 104 may comprise access terminals. In some implementations the nodes 102 facilitate communication between the nodes of a network (e.g., a cellular network, a WiMAX network, etc.). For example, when an access terminal (e.g., an access terminal 104A) is within a coverage area of an access point (e.g., an access point 102A) or a relay point, the access terminal 104A may thereby communicate with another device of the system 100 or a device of some other network that is coupled to communicate with the system 100. Here, one or more of the nodes (e.g., nodes 102B and 102D) may comprise a wired access point that provides connectivity to another network or networks (e.g., a wide area network 108 such as the Internet).

In some aspects two or more nodes of the system 100 associate with one another to establish traffic flows between the nodes via one or more communication links. For example, the nodes 104A and 104B may associate with one another via corresponding access points 102A and 102C. Thus, one or more traffic flows may be established to and from access terminal 104A via access point 102A and one or more traffic flows may be established to and from access terminal 104B via access point 102C.

In some cases, several nodes in the system 100 may attempt to transmit at the same time (e.g., during the same timeslot). Depending on the relative locations of the transmitting and receiving nodes and the transmit power of the transmitting nodes, it may be possible to reliably conduct such concurrent communications. Under these circumstances, the wireless resources of the system 100 may be well utilized as compared to, for example, a system that simply uses a carrier sense multiple access ("CSMA") mode of operation.

Under other circumstances, however, wireless transmissions from a node in the system 100 may interfere with reception at a non-associated node in the system 100. For example, the node 104B may be receiving from the node 102C (as represented by a wireless communication symbol 106A) at the same time that a node 102D is transmitting to a node 104C (as represented by a symbol 106B). Depending on the distance between the nodes 104B and 102D and the transmission power of the node 102D, transmissions from the node 102D (as represented by a dashed symbol 106C) may interfere with reception at the node 104B. In a similar manner, transmissions from the node 104B may interfere with reception at the node 102D depending on the location and transmission power of the node 104B.

To mitigate interference such as this, the nodes of a wireless communication system may employ an inter-node messaging scheme. For example, a receiving node that is experiencing interference may transmit a resource utilization message ("RUM") to indicate that the node is disadvantaged in some way. A neighboring node that receives the RUM (e.g., a potential interferer) may elect to limit its future transmissions in some way to avoid interfering with the RUM-sending node (i.e., the receiving node that sent the RUM). Here, a decision by a receiving node to transmit a RUM may be based, at least in part, on quality of service associated with data received at that node. For example, a receiving node may transmit a RUM in the event the current level of quality of service for one or more of its links or flows falls below a desired quality of service level. Conversely, the node may not transmit a RUM if the quality of service is acceptable.

A RUM may take various forms. For example, in some cases a RUM may consist of a series of tones. In some cases different tones may cover different frequency bands. In some cases the RUMs from different devices may be ordered in some manner (e.g., in time and/or frequency)

Priority information associated with a RUM also may take various forms. For example, in some cases priority information may take the form of a weighting factor (weight). Such a weighting factor may be normalized. For example, a weighting factor may be normalized so that it is represented by a few bits (e.g., two or three bits) to reduce the overhead associated with the weighting factor. In some cases priority may be indicated by the ordering of RUMs (e.g., in time and/or frequency). For example, RUMs occurring earlier in time and/or on certain frequencies may be associated with a higher priority.

In some aspects a RUM may be used to mitigate (e.g., clear) interference on one or more channels. For example, in some cases each RUM relates to a single channel (e.g., a single carrier that is associated with a given frequency band). Here, whenever a node wishes to clear interference on that channel, the node may transmit a RUM (e.g., via a frequency-division multiplexed control channel). In other cases, each RUM may relate to a set of channels. For example, in some multi-channel systems a node may transmit a RUM whenever it wishes to clear interference on all of the channels. In other multi-channel systems a RUM may be defined to relate to a subset of the channels. For example, whenever a node wishes to clear interference on a subset of the channels, the node may transmit a RUM in conjunction with an indication of the channel(s) to which the RUM applies. In such a case, the channel indication may be included in the RUM.

A channel indication may take various forms. For example, in some cases the channel indication may take the form of a set of bits where each bit corresponds to a branch of a tree, where each branch corresponds, in turn, to a channel. For example, one bit may correspond to a first channel, another bit may correspond to a set of channels (e.g., which may include one or more channels or sets of channels). In other cases, the channel indication may take the form of a bit mask. For example, each bit of the mask may correspond to a unique one of the channels.

Sample contention resolution operations that may be performed by a system such as the system 100 will now be described in the context of the flowcharts of FIGS. 2-5. For convenience, the operations of FIGS. 2-5 (or any other operations discussed or taught herein) may be described as being performed by specific components (e.g., components of a system 600 as shown in FIG. 6). It should be appreciated, however, that these operations may be performed by other types of components and may be performed using a different number of components. It also should be appreciated that one or more of the operations described herein may not be employed in a given implementation.

FIG. 6 illustrates sample components that may be employed in a first node, designated transmitting node 602, and a second node, designated receiving node 604. To reduce the complexity of FIG. 6, only two nodes are shown in the system 600. In practice, however, a system such as the system 600 (e.g., corresponding to the system 100) will have many nodes operating as transmitting nodes and many nodes operating as receiving nodes at a given time. The transmitting node 602 may transmit to one or more receiving nodes (e.g., as represented in some instances herein by receiving node 604). In addition, the transmitting node 602 receives RUMs from one or more receiving nodes (e.g., as represented in some instances herein by receiving node 604).

The nodes 602 and 604 include respective transceivers 606 and 608 for communicating with other nodes. The transceiver 606 includes a transmitter 610 for sending signals (e.g., messages) and a receiver 612 for receiving signals (e.g., messages such as RUMs in some cases). The transceiver 608 includes a transmitter 614 for sending signals (e.g., messages such as RUMs in some cases) and a receiver 616 for receiving signals (e.g., messages).

The nodes 602 and 604 also include other components that may be used in conjunction with resource contention resolution as taught herein. For example, the node 604 may include a transmit RUM processor 618 that generates RUMs to reserve allocated resources and causes the RUMS to be transmitted (e.g., broadcast) to other nodes in the system. Conversely, the node 602 may include a receive RUM processor 620 that processes received RUMs to determine whether/how to use the allocated resources. Various aspects of the processors 618 and 620 are described below.

Figure 2:
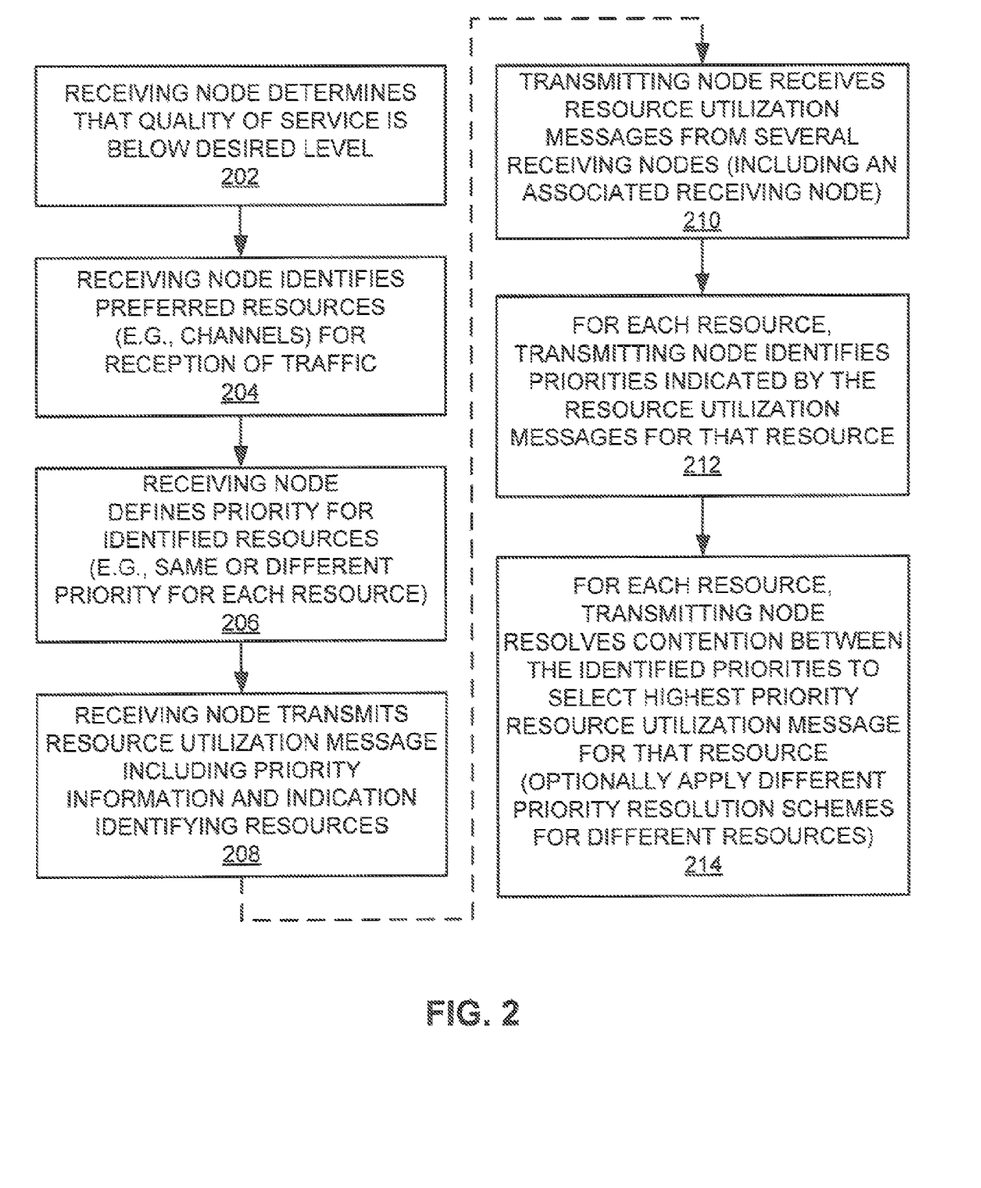
FIG. 2 is a simplified flowchart of several sample aspects of operations that may be performed to resolve contention for multiple resources.

Referring now to FIG. 2, as discussed above, the disclosure relates in some aspects to resolving contention for a resource in a multi-resource system. In particular, contention is resolved amongst two or more received RUMs that have the same priority (e.g., weight) in a multi-resource system.

Here, a resource may comprise, for example, one or more channels (e.g., each of which is associated with a carrier), one or more subchannels (e.g., associated with subcarriers that comprise subsets of a frequency band associated with a carrier), one or more interlaces, one or more timeslots, and so on. As a specific example, in a multi-carrier system, the available bandwidth is divided into a number of carriers (e.g., 4 carriers). Here, each transmitting node may be scheduled over one or more carriers (e.g., scheduled over several subcarriers of a given carrier), thereby allowing better sharing of the resources. For illustration purposes, various aspects of the disclosure will be described in the context of a multi-carrier system where contention is resolved for one or more carriers (e.g., each comprising a set of subcarriers). It should be appreciated that the teachings herein may be generally applicable to a multi-resource system (e.g., where contention is resolved for resources other than or in addition to carriers).

As mentioned above, a receiving node may send out a RUM when the node is unable to meet its quality of service ("QoS") requirements. Accordingly, as represented by block 202 of FIG. 2, at some point in time a receiving node (e.g., a quality of service determiner 622 as shown in FIG. 6) determines that quality of service at the node is below a desired level. The QoS requirement may be in the form of throughput (e.g., for full buffer traffic), latency (e.g., for voice traffic), average spectral efficiency, minimum carrier-to-interference ratio ("C/I"), or some other suitable metric or metrics. Thus, the operations of block 202 may involve, for example, determining whether the throughput of received traffic is too low or whether interference associated with received traffic is too high.

As represented by block 204, the receiving node (e.g., a resource identifier 624) may identify preferred resources for the reception of traffic. For example, in a multi-channel (e.g., multi-carrier) system, a given receiving node may be configured to use a specified subset (e.g., the first two channels) or a specified percentage (e.g., two out of four) of a set of channels that are allocated for use in a system.

As represented by block 206, the receiving node (e.g., a priority determiner 626) may define one or more priorities associated with the identified resources. For example, a priority (hereafter referred to, for convenience, as a "weight") may signifies the "degree of disadvantage" faced by the node that is transmitting the RUM. As mentioned above, this degree of disadvantage may be a function (e.g., a ratio) of the node's actual QoS and the node's desired QoS. In some cases a single priority is defined for a set of resources (e.g., a single weight defined for multiple carriers). In some cases different priorities are defined for different resources (e.g., different weights defined for different carriers).

As represented by block 208, the receiving node (e.g., a RUM generator 628) generates a RUM including the priority information and an indication that identifies the resources to which the RUM applies (e.g., resources identified at block 204). The receiving node (e.g., the transmitter 614) then transmits the RUM so it will be heard by transmitting nodes that may potentially interference with reception at the receiving node and by the transmitting node that is associated with this receiving node.

The priority information may be included in a RUM in various ways. In some cases an indication of the priority (e.g., a RUM weight) is encapsulated in the RUM. In such cases, the indication may be quantized (e.g., to a few bits as discussed above) to reduce the overhead of the RUM. In some cases the RUM may be transmitted in a manner this is indicative of the assigned priority. For example, the RUM may be transmitted at a particular time (e.g., a timeslot), whereby the time of transmission is indication of the relative priority (e.g., RUMs transmitted earlier in time have higher priority). Similarly, the RUM may be transmitted at a particular frequency (e.g., frequency band), whereby the frequency of transmission is indicative of the relative priority (e.g., RUMs transmitted at higher frequencies have higher priority).

The resource indication also may be included in a RUM in various ways. For example, as discussed above, in some cases a RUM may comprise a resource mask (e.g., a carrier mask) that indicates the resources to which the RUM applies. As a specific example, in a multi-carrier system, the RUM message may be augmented with a carrier indication (e.g., a bitmask that identifies a subset of a set of carriers to which the RUM applies). Through the use of such an indication, a node sending out the RUM may be able to reduce interference from its neighbors over a subset of carriers, rather than all of the carriers, in the event the node doesn't need to use all of the carriers or is not authorized to use all of the carriers (e.g., at a given point in time).

As represented by block 210, a transmitting node (e.g., the receiver 610 in FIG. 6) may receive RUMs from several receiving nodes. Here, the transmitting node may receive RUMs from one or more associated receiving nodes (e.g., a node to which the transmitting node is transmitting information) and/or from one or more non-associated receiving nodes (e.g., nearby receiving nodes that are receiving information from other transmitting nodes).

The transmitting node may ascertain whether to obey these RUMs based on which RUMs have highest priority. For example, the transmitting node may obey a RUM from a non-associated receiving node if the weight of the RUM is higher than the weights of the RUMs received from the transmitting node's associated receiving nodes (e.g., the transmitting node's own receivers).

In some aspects contention in a multi-resource system may be resolved by separately resolving contention for each resource. As mentioned above, the transmitting node may receive RUMs from different receiving nodes where each of the RUMs may include a resource indication that specifies the resources for which that particular RUM applies, and where each of the RUMs may be associated with priority information. In this case, the transmitting node may resolve contention for a first resource based on the RUMs (and corresponding priorities) associated with the first resource, then resolve contention for a second resource based on the RUMs (and corresponding priorities) associated with the second resource, and so on.

As represented by block 212, the transmitting node (e.g., a received RUM resource identifier 630) may thus identify each of the resources associated with the received RUMs. Then, for each of the identified resources, the transmitting node (e.g., a received RUM priority identifier 632) identifies the priorities indicated by the RUMs associated with that resource (e.g., the RUMs whose resource indications identified that particular resource).

As represented by block 214, the transmitting node may then resolve any contention among the RUMs priorities for each resource. Here, the RUM with the highest priority in a given set of priorities associated with a resource may be designated as the winning RUM for that resource. As a specific example, when a transmitting node hears a RUM, it compares the weight of the incoming RUM to the weight of any RUM that it has heard from its own receiving node(s). If the weight of the received RUMs from any non-associated receiving node is greater than each of the weights of the RUMs received from receiving nodes that are associated with the transmitting node, the transmitting node will obey the higher weight RUM (e.g., by decreasing the amount of interference the transmitting node may cause on that resource).

Contention resolution for each of the other resources may then be provided in a similar manner. For example, the transmitting node may determine, for each resource, whether to limit transmission on that resource based on the received RUMs that are directed to that resource.

Here, the transmitting node will obey the RUMs only on the resources specified by the resource indications. That is, if there are no RUMs directed to a given resource, the transmitting node need not limit its transmission on that resource. When a transmitting node elects to obey multiple RUMs from different receiving nodes, the transmitting node may perform an 'OR' operation on the resources specified by all of the RUM resource indications. The complement of the result of this operation may thus indicate the resources on which the transmitting node may transmit.

In some cases, different contention schemes may be employed for different resources. For example, the type of contention scheme deployed for a given resource may depend on the type of traffic (e.g., voice, data, real-time traffic, best-effort traffic, full buffer traffic, and so on) carried by that resource.

Figure 3:
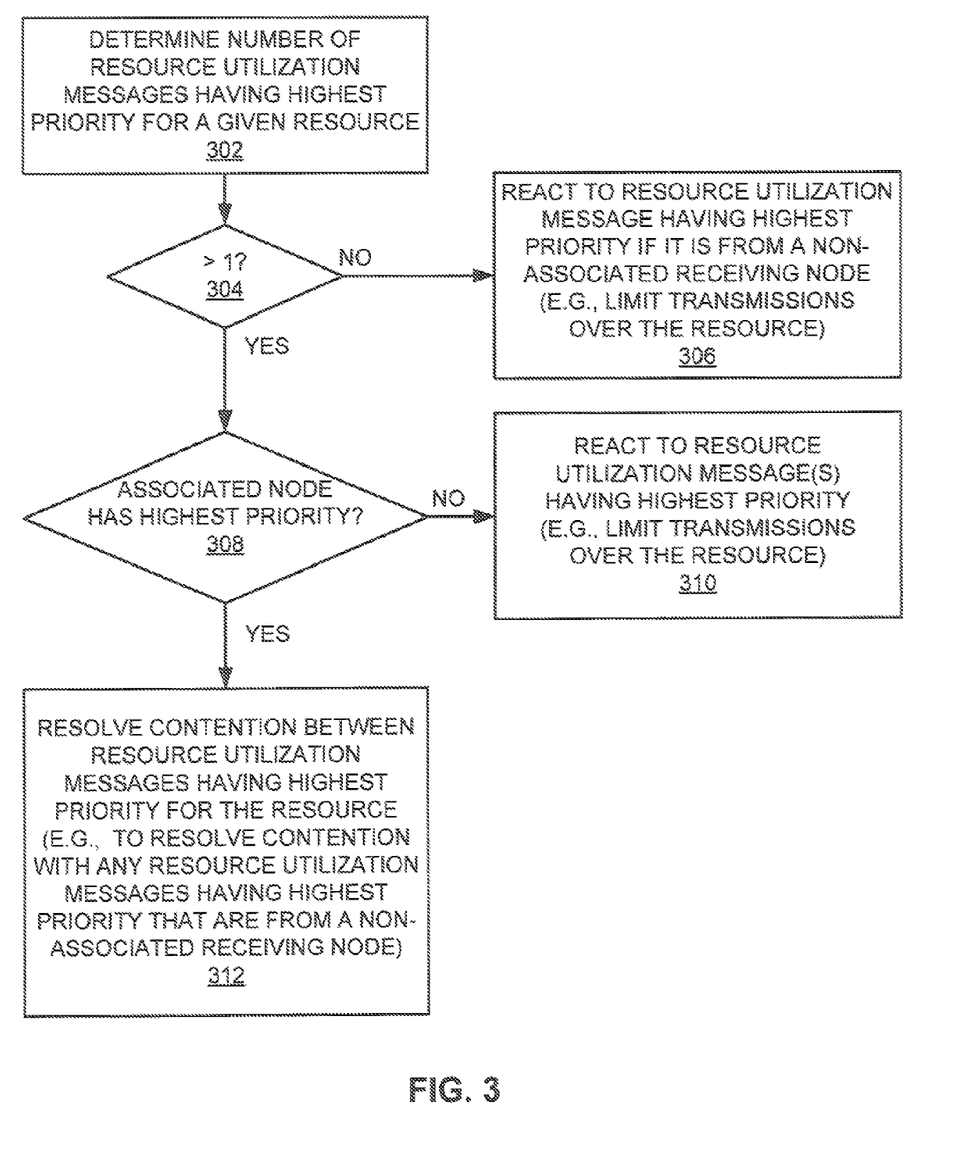
FIG. 3 is a simplified flowchart of several sample aspects of operations that may be performed to resolve contention for a given resource.

FIG. 3 describes sample operations that may be performed by a transmitting node to resolve contention for a given resource. Thus, a transmitting node may perform a unique iteration of the operations of FIG. 3 for each resource identified in a set of received RUMs.

As represented by block 302, for a given resource, the transmitting node determines the number of RUMs that have the highest priority. That is, the transmitting node first determines the magnitude of the highest priority, then determines the number of RUMs that have that priority.

If, at block 304, only one RUM has the highest priority, the operational flow proceeds to block 306. The transmitting node then determines whether to react to this RUM. If the highest priority RUM is from a receiving node associated with the transmitting node, the transmitting node may ignore the RUM. That is, the transmitting node may proceed with the next scheduled transmission (e.g., the timeslot to which the RUMs are directed) to the receiving node without the need to limit the transmission due to the received RUMs.

Conversely, if the highest priority RUM is from a non-associated receiving node, the transmitting node may react to (e.g., obey) the RUM. There are various methods by which the transmitting node may obey a RUM (e.g., limit transmission) for an upcoming transmission opportunity (e.g., the next scheduled timeslot) on a given resource. Several examples include: backing-off in time (e.g., refraining from transmitting over some slots or interlaces); backing-off in frequency (e.g., refraining from transmitting over some frequency bands or carriers); and backing-off in power (e.g., reducing transmit power during the next timeslot).

If more than one RUM has the highest priority at block 304, the operational flow proceeds instead to block 308. As mentioned above, a transmitting node may receive a number of RUMs that have the same weight. For example, in some cases a RUM weight may be quantized to a fixed number of bits (e.g. quantized to 2 or 3 bits), thereby increasing the probability that different receiving nodes will sends RUMS associated with the same priority. As a simple example, assume that four RUMs are received, each of which has carrier C0 indicated in its respective carrier indication (e.g., carrier bitmask). In addition, the four RUMs have respective weights of 3, 1, 3, and 2. In this case, two of the RUMs have the highest weight (weight 3).

At block 308, the transmitting node determines whether one of its associated receiving nodes sent at least one of the highest priority RUMs. If not, the operational flow proceeds to block 310 where the transmitting node reacts to the RUM (e.g., the transmitting node obeys the RUM as described above at block 306).

If at least one receiving node that is associated with the transmitting node sent a highest priority RUM at block 308, the operational flow proceeds to block 312 whereby the transmitting node resolves any contention for the resource. Here, if all of the RUMs having the highest priority are from receiving nodes associated with the transmitting node, the transmitting node may ignore the RUM (e.g., as described above at block 306).

If, on the other hand, at least one non-associated receiving node sent one of the highest priority RUMs, the transmitting node resolves the contention for the resource. Sample contention resolution schemes that may be used to resolve RUM contention when multiple RUMs of the highest weight are received will now be described in conjunction with FIGS. 4 and 5.

Figure 4:
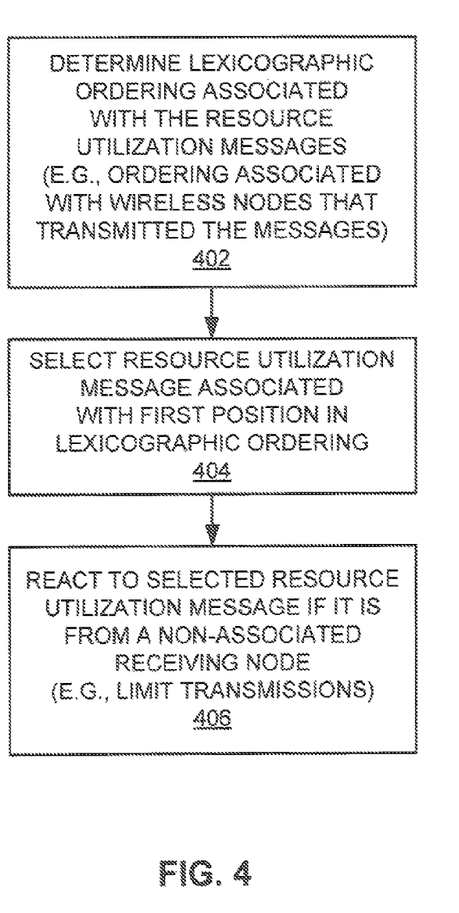
FIG. 4 is a simplified flowchart of several sample aspects of operations that may be performed to resolve contention based on lexicographic ordering.

FIG. 4 describes a sample lexicographic ordering scheme. As represented by block 402, the transmitting node determines a lexicographic ordering associated with the set of RUMs that have the highest priority. For example, a lexicographic ordering may be applied to nodes in the system whereby different nodes may have a different ranking in the lexicographical ordering. As a specific example, a lexicographic ordering may be based on identifiers associated with each node. Thus, the ranking of a given node relative to another node may depend on the node identifiers assigned to those nodes.

Lexicographic ordering may be associated with various entities in the system in various implementations. In some cases lexicographic ordering may be associated with RUMs from the ordered nodes. Here, a given transmitting node may maintain information indicative of the ordering of the receiving nodes that transmit the RUMs. Alternatively, each of the RUMs may include a parameter that is indicative of the ordering of the nodes. In some cases lexicographic ordering may be associated with identifiers of the resources. For example, in cases where RUMs may be sent via different frequencies (e.g., tones), lexicographic ordering may be associated with the frequencies, whereby a RUM sent at a given frequency may be deemed to be higher (e.g., first) in the ordering than a RUM send at a different frequency.

As represented by block 404, when a number of equal priority RUMs are received, the highest priority may be given to the RUM associated with the highest lexicographical ordering (e.g., the RUM from the node that is first in the specified order). In other words, the transmitting node may select a RUM associated with the highest lexicographical ordering to identify a winner of the contention for a given resource.

As represented by block 406, the transmitting node may then determine whether/how to react to the winning RUM based on whether the RUM is from an associated receiving node or a non-associated receiving node.

Figure 5:
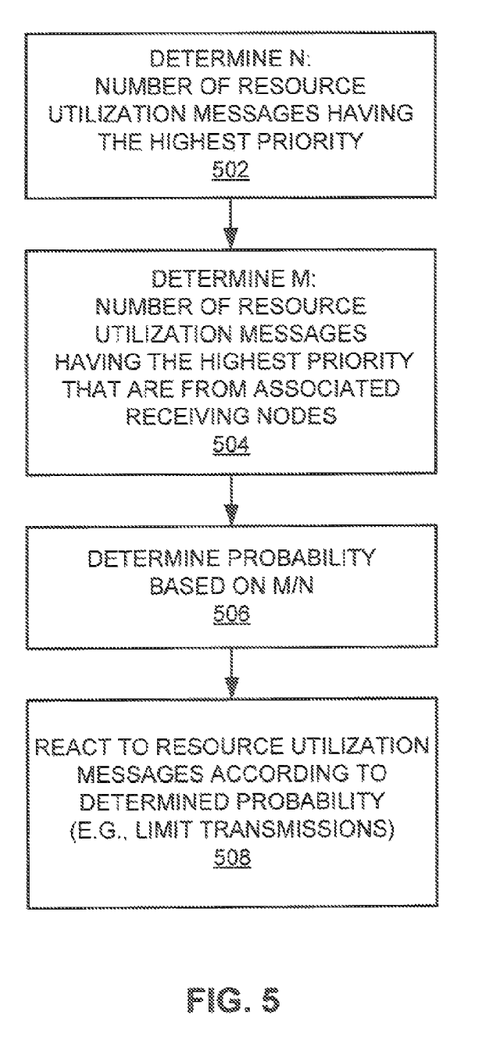
FIG. 5 is a simplified flowchart of several sample aspects of operations that may be performed to resolve contention based on random probability.
Figure 6:
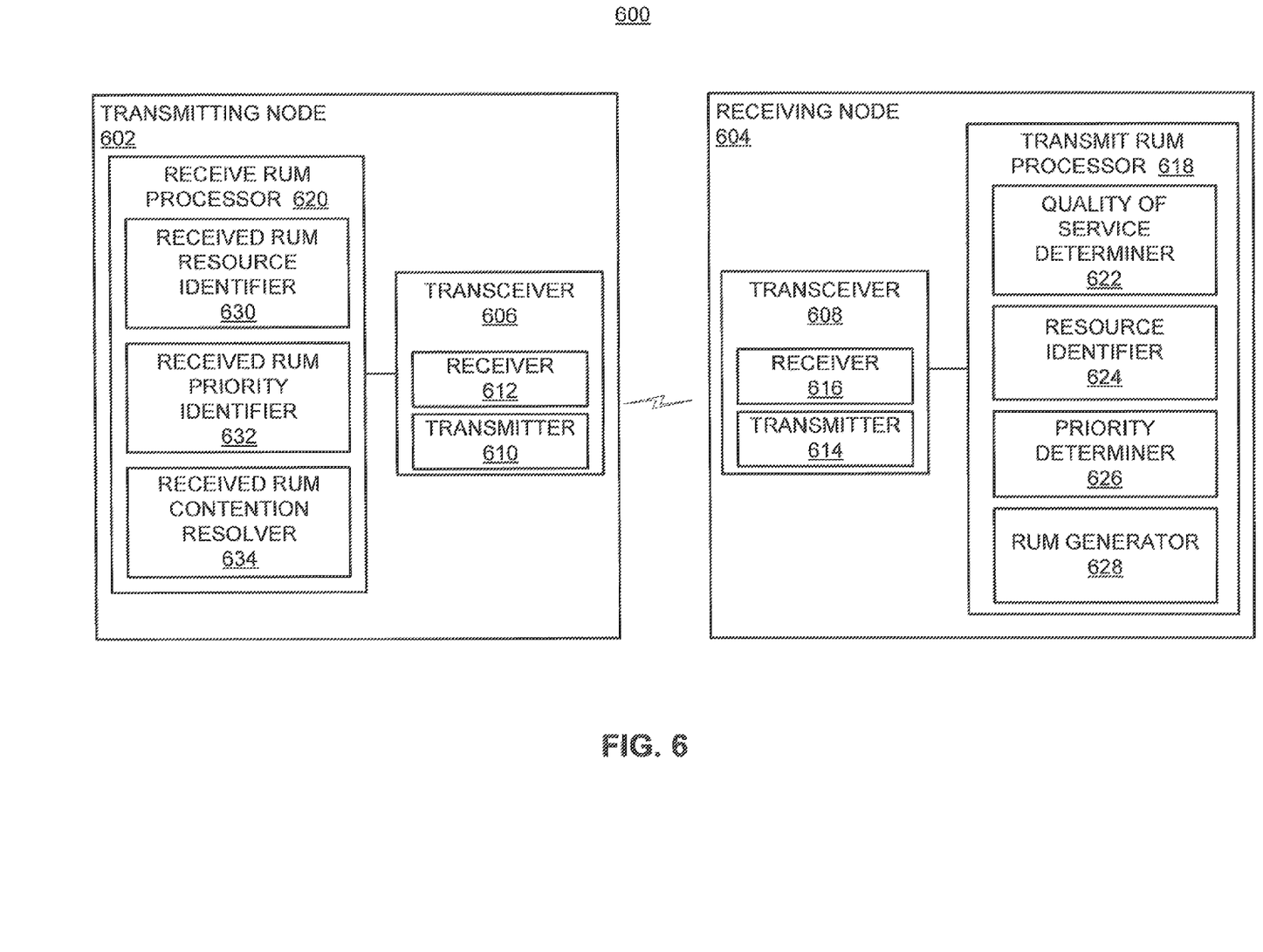
FIG. 6 is a simplified block diagram of several sample components of communication nodes.

FIG. 5 describes a sample random probability-based scheme that may be used to resolve contention associated with a set of RUMs that have the highest priority for a given resource. In this example, the transmitting node determines whether to obey a RUM based on a probability weighted by the number of RUMs received. Accordingly, at block 502 the transmitting node determines the number of RUMs directed to a given resource that have the highest priority. This number is designated n in the discussion that follows.

The probability also may be weighted by the proportion of the highest weight RUMs that a transmitting node has heard from its associated receiving nodes. Thus, at block 504, the transmitting node determines, from the set of n RUMs, the number of RUMs that are from associated nodes. This number is designated m in the discussion that follows. Thus, n−m RUMs are from non-associated receiving nodes The transmitting node may then determine the probability based on m and n at block 506 and determine whether/how to react to the RUMs based on this probability at block 508. For example, the transmitting node may decide to obey the RUM with probability (n−m)/n. In other words, the transmitting node may decide to transmit on a given resource with probability m/n.

An advantage of such a scheme may be that it gives higher priority to those cells (e.g., defined by an access point and associated access terminals) where many of the receiving nodes have low quality of service ("QoS"). Here, if only one of the receiving nodes of a first transmitting node has low QoS, while a second transmitting node of a neighboring cell has five receiving nodes with low QoS, it may be much more likely that the first transmitting node will limit its transmissions in response to the RUMs.

In the reverse link, a transmitting node may hear a RUM from only one receiving node (e.g., its access point). Consequently, m may be equal to one in this case.

Figure 7:
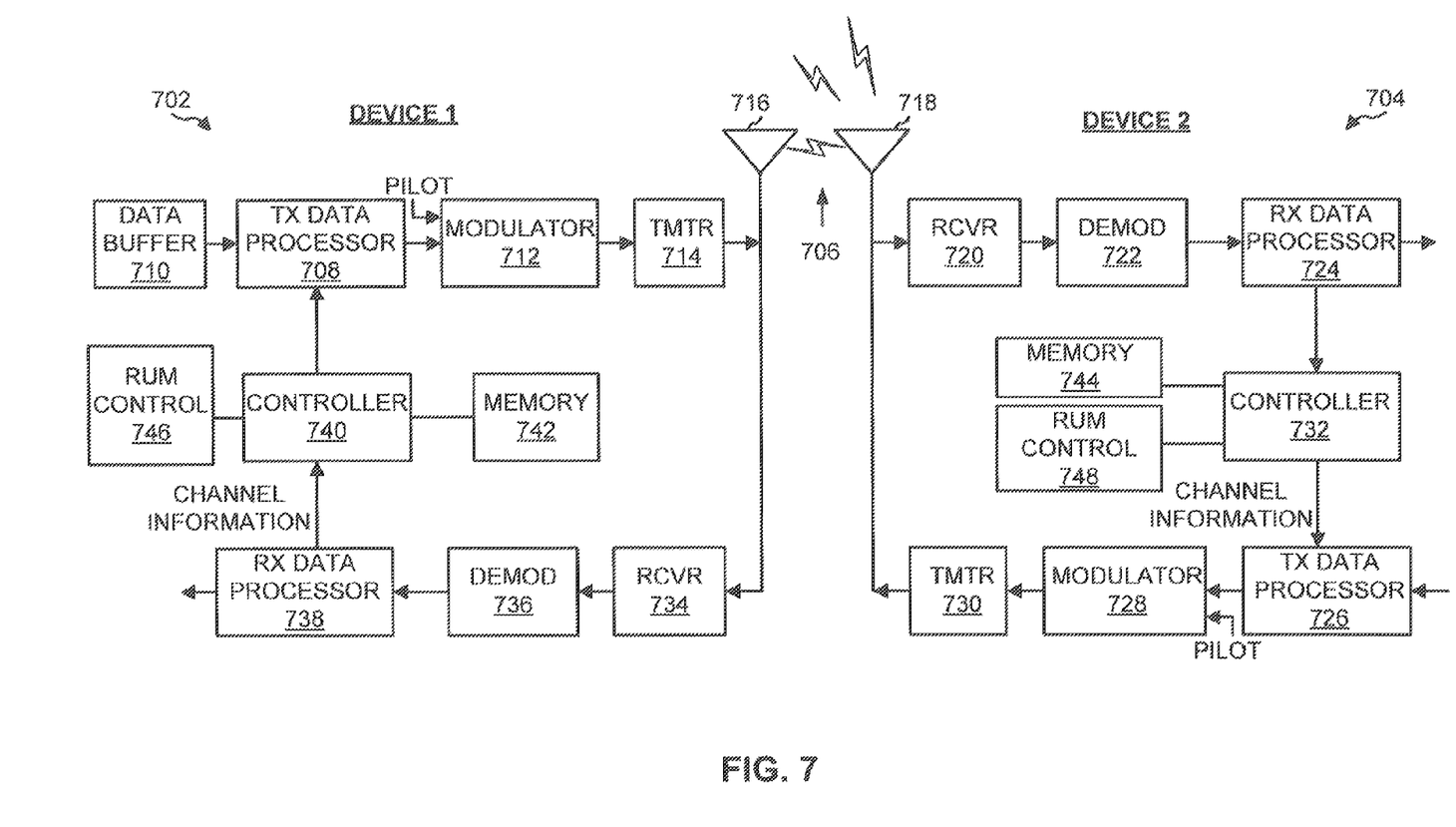
FIG. 7 is a simplified block diagram of several sample aspects of communication components.

The teachings herein may be incorporated into a device employing various components for communicating with at least one other wireless device. FIG. 7 depicts several sample components that may be employed to facilitate communication between devices. Here, a first device 702 (e.g., an access terminal) and a second device 704 (e.g., an access point) are adapted to communicate via a wireless communication link 706 over a suitable medium.

Initially, components involved in sending information from the device 702 to the device 704 (e.g., a reverse link) will be treated. A transmit ("TX") data processor 708 receives traffic data (e.g., data packets) from a data buffer 710 or some other suitable component. The transmit data processor 708 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 712 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 714 processes (e.g., converts to analog, filters, amplifies, and frequency upconverts) the output chip stream and generates a modulated signal, which is then transmitted from an antenna 716.

The modulated signals transmitted by the device 702 (along with signals from other devices in communication with the device 704) are received by an antenna 718 of the device 704. A receiver ("RCVR") 720 processes (e.g., conditions and digitizes) the received signal from the antenna 718 and provides received samples. A demodulator ("DEMOD") 722 processes (e.g., demodulates and detects) the received samples and provides detected data symbols, which may be a noisy estimate of the data symbols transmitted to the device 704 by the other device(s). A receive ("RX") data processor 724 processes (e.g., symbol demaps, deinterleaves, and decodes) the detected data symbols and provides decoded data associated with each transmitting device (e.g., device 702).

Components involved in sending information from the device 704 to the device 702 (e.g., a forward link) will be now be treated. At the device 704, traffic data is processed by a transmit ("TX") data processor 726 to generate data symbols. A modulator 728 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 730 and transmitted from the antenna 718. In some implementations signaling for the forward link may include power control commands and other information (e.g., relating to a communication channel) generated by a controller 732 for all devices (e.g. terminals) transmitting on the reverse link to the device 704.

At the device 702, the modulated signal transmitted by the device 704 is received by the antenna 716, conditioned and digitized by a receiver ("RCVR") 734, and processed by a demodulator ("DEMOD") 736 to obtain detected data symbols. A receive ("RX") data processor 738 processes the detected data symbols and provides decoded data for the device 702 and the forward link signaling. A controller 740 receives power control commands and other information to control data transmission and to control transmit power on the reverse link to the device 704.

The controllers 740 and 732 direct various operations of the device 702 and the device 704, respectively. For example, a controller may determine an appropriate filter, reporting information about the filter, and decode information using a filter. Data memories 742 and 744 may store program codes and data used by the controllers 740 and 732, respectively.

FIG. 7 also illustrates that the communication components may include one or more components that perform interference management operations as taught herein. For example, a RUM control component 746 may cooperate with the controller 740 and/or other components of the device 702 to send and receive signals to another device (e.g., device 704) as taught herein. Similarly, a RUM control component 748 may cooperate with the controller 732 and/or other components of the device 704 to send and receive signals to another device (e.g., device 702). It should be appreciated that for each device 702 and 704 the functionality of two or more of the described components may be provided by a single component. For example, a single processing component may provide the functionality of the RUM control component 746 and the controller 740 and a single processing component may provide the functionality of the RUM control component 748 and the controller 732.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access ("CDMA") systems, Multiple-Carrier CDMA ("MCCDMA"), Wideband CDMA ("W-CDMA"), High-Speed Packet Access ("HSPA," "HSPA+") systems, Time Division Multiple Access ("TDMA") systems, Frequency Division Multiple Access ("FDMA") systems, Single-Carrier FDMA ("SC-FDMA") systems, Orthogonal Frequency Division Multiple Access ("OFDMA") systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access ("UTRA)", cdma2000, or some other technology. UTRA includes W-CDMA and Low Chip Rate ("LCR"). The cdma2000 technology covers IS-2000, IS-95 and IS-856 standards. A TDMA network may implement a radio technology such as Global System for Mobile Communications ("GSM"). An OFDMA network may implement a radio technology such as Evolved UTRA ("E-UTRA"), IEEE 802.11, IEEE 802.16, IEEE 802.20, Flash-OFDM®, etc. UTRA, E-UTRA, and GSM are part of Universal Mobile Telecommunication System ("UMTS"). The teachings herein may be implemented in a 3GPP Long Term Evolution ("LTE") system, an Ultra-Mobile Broadband ("UMB") system, and other types of systems. LTE is a release of UMTS that uses E-UTRA. Although certain aspects of the disclosure may be described using 3GPP terminology, it is to be understood that the teachings herein may be applied to 3GPP (Re199, Re15, Re16, Re17) technology, as well as 3GPP2 (1×RTT, 1×EV-DO Re1O, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller ("RNC"), a base station ("BS"), a radio base station ("RBS"), a base station controller ("BSC"), a base transceiver station ("BTS"), a transceiver function ("TF"), a radio transceiver, a radio router, a basic service set ("BSS"), an extended service set ("ESS"), or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may thus include various components that perform functions based on data transmitted by or received at the wireless node. For example, an access point and an access terminal may include an antenna for transmitting and receiving signals (e.g., messages relating to control and/or data). An access point also may include a traffic manager configured to manage data traffic flows that its receiver receives from a plurality of wireless nodes or that its transmitter transmits to a plurality of wireless nodes. In addition, an access terminal may include a user interface configured to output an indication based on received data (e.g., received via a resource of a plurality of resource).

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

Figure 8:
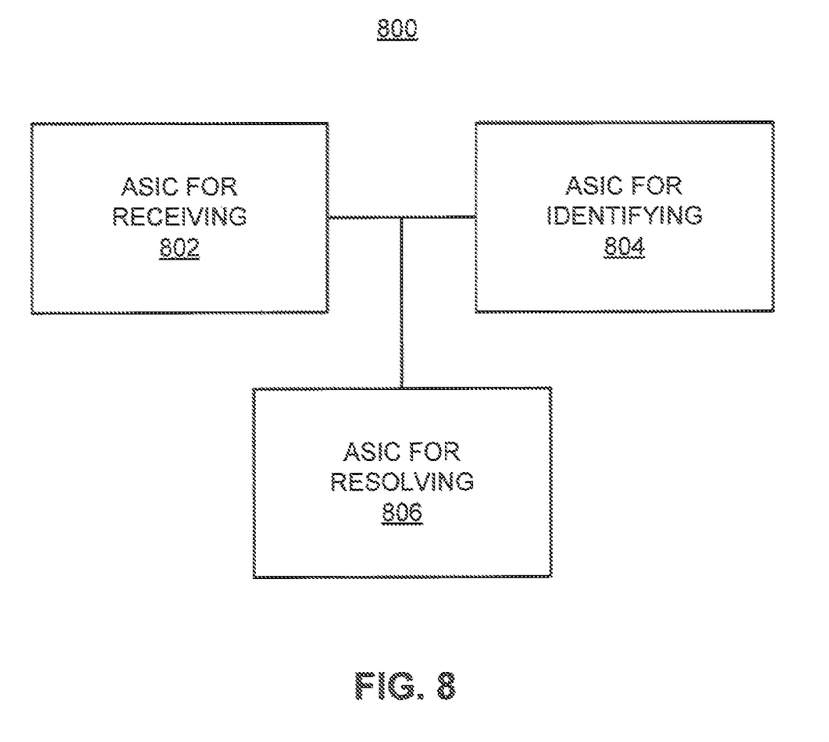
FIG. 8 is a simplified block diagram of several sample aspects of an apparatus configured to provide contention resolution as taught herein.

The components described herein may be implemented in a variety of ways. Referring to FIG. 8, an apparatus 800 is represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof The apparatus 800 may include one or more modules that may perform one or more of the functions described above with regard to various figures. For example, an ASIC for receiving 802 may correspond to, for example, a receiver as discussed herein. An ASIC for identifying 804 may correspond to, for example, a priority identifier as discussed herein. An ASIC for resolving 806 may correspond to, for example, a contention resolver as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatus 800 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIG. 8 as well as other components and functions described herein, may be implemented using any suitable means. Such means also may be implemented, at least in part, using corresponding structure as taught herein. For example, the components described above in conjunction with the "ASIC for" components of FIG. 8 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof"

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., encoded with codes executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of wireless communication, comprising:
    Receiving, by a receiver, a plurality of resource utilization messages, each comprising an indication that identifies a plurality of resources;
    identifying, by a priority identifier, for each of the resources, priorities associated with the resource utilization messages; and
    resolving, by a contention resolver, for each of the resources, contention between the identified priorities, using a first contention resolution scheme based on lexicographic ordering associated with the resource utilization messages if two or more of the resource utilization messages have equal priority, for a first type of resource and a second contention resolution scheme based on a probability that is weighted by a number of highest priority resource utilization messages received for a given resource, for a second type of resource.

2. The method of claim 1, wherein the priorities associated with the resource utilization messages are indicated by weights included in the resource utilization messages.

3. The method of claim 1, wherein the resources comprise at least one of: channels, subchannels, or interlaces.

4. The method of claim 1, wherein: the identification of the priorities for a specific one of the resources comprises identifying a set of the resource utilization messages associated with the specific resource; and the resolving of the contention for the specific resource comprises resolving contention between the resource utilization messages of the identified set.

5. The method of claim 4, wherein the resolving of the contention is based on a lexicographic ordering associated with the resource utilization messages of the identified set.

6. The method of claim 4, wherein the resolving of the contention is based on a lexicographic ordering associated with identifiers of the resources.

7. The method of claim 4, wherein the resolving of the contention is based on lexicographic ordering of nodes that transmitted the resource utilization messages of the identified set.

8. The method of claim 7, wherein: one of the nodes is first in the lexicographical ordering; and the resolving of the contention further comprises: identifying which one of the resource utilization messages of the identified set was transmitted by the one node that is first in the lexicographical ordering; and assigning a higher priority to the identified resource utilization message associated with the one node.

9. The method of claim 7, wherein the lexicographical ordering is based on identifiers assigned to the nodes.

10. The method of claim 7, wherein the resolving of the contention is further based on a lexicographic ordering associated with identifiers of the resources.

11. The method of claim 4, wherein the resolving of the contention for the specific resource further comprises reacting to one of the resource utilization messages of the identified set according to a probability that is an output of a function.

12. The method of claim 11, wherein the function is based on a quantity of the resource utilization messages of the identified set.

13. The method of claim 4, wherein the resolving of the contention for the specific resource further comprises reacting to one of the resource utilization messages of the identified set according to a probability that is based on a quantity of the resource utilization messages of the identified set associated with a highest priority.

14. The method of claim 13, wherein the probability is further based on a quantity of the resource utilization messages associated with the highest priority transmitted by associated receiving nodes.

15. The method of claim 4, wherein the resolving of the contention for the specific resource further comprises reacting to one of the resource utilization messages of the identified set according to a probability that is based on a ratio of: a quantity of the resource utilization messages of the identified set associated with a highest priority; and a quantity of the resource utilization messages associated with the highest priority transmitted by associated receiving nodes.

16. The method of claim 4, wherein the identification of the set of the resource utilization messages comprises identifying resource utilization messages associated with a highest priority.

17. The method of claim 1, wherein different contention resolution schemes are employed for different ones of the resources.

18. The method of claim 17, wherein the different contention resolution schemes are associated with different types of traffic carried by the resources.

19. An apparatus for wireless communication, comprising:
means for receiving a plurality of resource utilization messages, each comprising an indication that identifies a plurality of resources;
means for identifying, for each of the resources, priorities associated with the resource utilization messages; and
means for resolving, for each of the resources, contention between the identified priorities, using a first contention resolution scheme based on lexicographic ordering associated with the resource utilization messages if two or more of the resource utilization messages have equal priority, for a first type of resource and a second contention resolution scheme based on a probability that is weighted by a number of highest priority resource utilization messages received for a given resource, for a second type of resource.

20. The apparatus of claim 19, wherein the priorities associated with the resource utilization messages are indicated by weights included in the resource utilization messages.

21. The apparatus of claim 19, wherein the resources comprise at least one of: channels, subchannels, or interlaces.

22. The apparatus of claim 19, wherein: the identification of the priorities for a specific one of the resources comprises identifying a set of the resource utilization messages associated with the specific resource; and the resolving of the contention for the specific resource comprises resolving contention between the resource utilization messages of the identified set.

23. The apparatus of claim 22, wherein the resolving of the contention is based on a lexicographic ordering associated with the resource utilization messages of the identified set.

24. The apparatus of claim 22, wherein the resolving of the contention is based on a lexicographic ordering associated with identifiers of the resources.

25. The apparatus of claim 22, wherein the resolving of the contention is based on lexicographic ordering of nodes that transmitted the resource utilization messages of the identified set.

26. The apparatus of claim 25, wherein: one of the nodes is first in the lexicographical ordering; and the resolving of the contention further comprises: identifying which one of the resource utilization messages of the identified set was transmitted by the one node that is first in the lexicographical ordering; and assigning a higher priority to the identified resource utilization message associated with the one node.

27. The apparatus of claim 25, wherein the lexicographical ordering is based on identifiers assigned to the nodes.

28. The apparatus of claim 25, wherein the resolving of the contention is further based on a lexicographic ordering associated with identifiers of the resources.

29. The apparatus of claim 22, wherein the resolving of the contention for the specific resource further comprises reacting to one of the resource utilization messages of the identified set according to a probability that is an output of a function.

30. The apparatus of claim 29, wherein the function is based on a quantity of the resource utilization messages of the identified set.

31. The apparatus of claim 22, wherein the resolving of the contention for the specific resource further comprises reacting to one of the resource utilization messages of the identified set according to a probability that is based on a quantity of the resource utilization messages of the identified set associated with a highest priority.

32. The apparatus of claim 31, wherein the probability is further based on a quantity of the resource utilization messages associated with the highest priority transmitted by associated receiving nodes.

33. The apparatus of claim 22, wherein the resolving of the contention for the specific resource further comprises reacting to one of the resource utilization messages of the identified set according to a probability that is based on a ratio of: a quantity of the resource utilization messages of the identified set associated with a highest priority; and a quantity of the resource utilization messages associated with the highest priority transmitted by associated receiving nodes.

34. The apparatus of claim 22, wherein the identification of the set of the resource utilization messages comprises identifying resource utilization messages associated with a highest priority.

35. The apparatus of claim 19, wherein different contention resolution schemes are employed for different ones of the resources.

36. The apparatus of claim 35, wherein the different contention resolution schemes are associated with different types of traffic carried by the resources.

37. An apparatus for wireless communication, comprising:
a receiver configured to receive a plurality of resource utilization messages, each comprising an indication that identifies a plurality of resources;
a priority identifier configured to identify, for each of the resources, priorities associated with the resource utilization messages; and
a contention resolver configured to resolve, for each of the resources, contention between the identified priorities, using a first contention resolution scheme based on lexicographic ordering associated with the resource utilization messages if two or more of the resource utilization messages have equal priority, for a first type of resource and a second contention resolution scheme based on a probability that is weighted by a number of highest priority resource utilization messages received for a given resource, for a second type of resource.

38. The apparatus of claim 37, wherein the priorities associated with the resource utilization messages are indicated by weights included in the resource utilization messages.

39. The apparatus of claim 37, wherein the resources comprise at least one of: channels, subchannels, or interlaces.

40. The apparatus of claim 37, wherein: the identification of the priorities for a specific one of the resources comprises identifying a set of the resource utilization messages associated with the specific resource; and the resolving of the contention for the specific resource comprises resolving contention between the resource utilization messages of the identified set.

41. The apparatus of claim 40, wherein the resolving of the contention is based on a lexicographic ordering associated with the resource utilization messages of the identified set.

42. The apparatus of claim 40, wherein the resolving of the contention is based on a lexicographic ordering associated with identifiers of the resources.

43. The apparatus of claim 40, wherein the resolving of the contention is based on lexicographic ordering of nodes that transmitted the resource utilization messages of the identified set.

44. The apparatus of claim 43, wherein: one of the nodes is first in the lexicographical ordering; and the resolving of the contention further comprises: identifying which one of the resource utilization messages of the identified set was transmitted by the one node that is first in the lexicographical ordering; and assigning a higher priority to the identified resource utilization message associated with the one node.

45. The apparatus of claim 43, wherein the lexicographical ordering is based on identifiers assigned to the nodes.

46. The apparatus of claim 43, wherein the resolving of the contention is further based on a lexicographic ordering associated with identifiers of the resources.

47. The apparatus of claim 40, wherein the resolving of the contention for the specific resource further comprises reacting to one of the resource utilization messages of the identified set according to a probability that is an output of a function.

48. The apparatus of claim 47, wherein the function is based on a quantity of the resource utilization messages of the identified set.

49. The apparatus of claim 40, wherein the resolving of the contention for the specific resource further comprises reacting to one of the resource utilization messages of the identified set according to a probability that is based on a quantity of the resource utilization messages of the identified set associated with a highest priority.

50. The apparatus of claim 49, wherein the probability is further based on a quantity of the resource utilization messages associated with the highest priority transmitted by associated receiving nodes.

51. The apparatus of claim 40, wherein the resolving of the contention for the specific resource further comprises reacting to one of the resource utilization messages of the identified set according to a probability that is based on a ratio of: a quantity of the resource utilization messages of the identified set associated with a highest priority; and a quantity of the resource utilization messages associated with the highest priority transmitted by associated receiving nodes.

52. The apparatus of claim 40, wherein the identification of the set of the resource utilization messages comprises identifying resource utilization messages associated with a highest priority.

53. The apparatus of claim 37, wherein different contention resolution schemes are employed for different ones of the resources.

54. The apparatus of claim 53, wherein the different contention resolution schemes are associated with different types of traffic carried by the resources.

55. A computer-program product for wireless communication, comprising:
a non-transitory computer-readable medium encoded with codes executable to: receive a plurality of resource utilization messages, each comprising an indication that identifies a plurality of resources;
identify, for each of the resources, priorities associated with the resource utilization messages; and
resolve, for each of the resources, contention between the identified priorities, using a first contention resolution scheme based on lexicographic ordering associated with the resource utilization messages if two or more of the resource utilization messages have equal priority, for a first type of resource and a second contention resolution scheme based on a probability that is weighted by a number of highest priority resource utilization messages received for a given resource, for a second type of resource.

56. An access point for wireless communication, comprising:
an antenna;
a receiver configured to receive a plurality of resource utilization messages via the antenna, each comprising an indication that identifies a plurality of resources;
a priority identifier configured to identify, for each of the resources, priorities associated with the resource utilization messages; and
a contention resolver configured to resolve, for each of the resources, contention between the identified priorities, using a first contention resolution scheme based on lexicographic ordering associated with the resource utilization messages if two or more of the resource utilization messages have equal priority, for a first type of resource and a second contention resolution scheme based on a probability that is weighted by a number of highest priority resource utilization messages received for a given resource, for a second type of resource.

57. An access terminal for wireless communication, comprising:
a receiver configured to receive a plurality of resource utilization messages, each comprising an indication that identifies a plurality of resources;
a priority identifier configured to identify, for each of the resources, priorities associated with the resource utilization messages;
a contention resolver configured to resolve, for each of the resources, contention between the identified priorities, using a first contention resolution scheme based on lexicographic ordering associated with the resource utilization messages if two or more of the resource utilization messages have equal priority, for a first type of resource and a second contention resolution scheme based on a probability that is weighted by a number of highest priority resource utilization messages received for a given resource, for a second type of resource; and
a user interface configured to output an indication of the identity of a resource of the plurality of resources based on data received via the resource.

* * * * *